United States Patent [19]

Dole

[11] Patent Number: 5,204,021
[45] Date of Patent: Apr. 20, 1993

[54] LANTHANIDE OXIDE FLUORIDE PHOSPHOR HAVING CERIUM LUMINESCENCE

[75] Inventor: Stephen L. Dole, Burnt Hills, N.Y.

[73] Assignee: General Electric Company, Schenectady, N.Y.

[21] Appl. No.: 817,036

[22] Filed: Jan. 3, 1992

[51] Int. Cl.$^5$ .............................................. C09K 11/86
[52] U.S. Cl. ............................................. 252/301.4 H
[58] Field of Search ................................ 252/301.4 H

[56] References Cited

U.S. PATENT DOCUMENTS

| | | | |
|---|---|---|---|
| 3,767,588 | 10/1973 | Otomo et al. | 252/301.4 H |
| 4,246,485 | 1/1981 | Bossomaier et al. | 252/301.4 H |
| 4,297,584 | 10/1981 | Buchanan et al. | 252/301.4 H |

OTHER PUBLICATIONS

Matsubara "Japan J. Appl. Phys.", 10 (1971) 1647-48.
Lobach et al "Chem Abstr.", vol. 90, 1979, 143748u.
"Phase Analyses of Lanthanide Oxide Fluorides", D. B. Shinn and H. A. Eick, Dept. of Chemistry, Michigan State University, Inorganic Chemistry, pp. 232-235 (1969).
"The Crystal Structure and Nonstoichiometry of Rare Earth Oxyfluoride", K. Niihara and S. Yajima, Bulletin of the Chemical Society of Japan, vol. 44, pp. 643-648 (1979).
"Luminescence of Inorganic Solids: From Isolated centres to Concentrated Systems," G. Blasse, Prog. Solid St. Chem., vol. 18, pp. 79-88, 1988.

*Primary Examiner*—Jack Cooper
*Attorney, Agent, or Firm*—James E. McGinness; James Magee, Jr.

[57] ABSTRACT

A phosphor comprising an effective amount of cerium to provide luminescence, in substantially a lanthanide oxide fluoride compound having a tetragonal crystal form, the lanthanide being from the group consisting of lutetium, gadolinium, yttrium, and mixtures thereof.

6 Claims, No Drawings

LANTHANIDE OXIDE FLUORIDE PHOSPHOR HAVING CERIUM LUMINESCENCE

BACKGROUND OF THE INVENTION

This invention relates to a cerium activated phosphor for computerized tomography and other x-ray, gamma radiation, and nuclear radiation detecting applications. More specifically, the invention relates to a lanthanide oxide fluoride compound having cerium luminescence.

Computerized tomography scanners are diagnostic instruments used in industrial and medical imaging. A body is exposed to a relatively planar beam or beams of radiation, such as x-ray or gamma ray radiation, the intensity of which varies in direct relationship to the energy absorption along a plurality of body paths. By measuring the radiation intensity along these paths from a plurality of different angles or views, a radiation absorption coefficient can be computed for various areas in any plane of the body through which the radiation passes. The absorption coefficients are used to produce a display of, for example, bodily organs intersected by the radiation.

Phosphors can be used to form scintillators which are excited by the impinging X-ray or gamma radiation, and emit optical wave length radiation. The optical output from the scintillator material is made to impinge upon photo electrically responsive materials in order to produce electrical output signals. The amplitude of the signals is directly related to the intensity of the impinging X-ray or gamma radiation. The electrical signals are digitized for processing by digital computer means which generate the absorption coefficients in a form suitable for display on a cathode ray tube screen or other permanent media.

In general, it is desirable that the amount of light output from the phosphors and resulting scintillator be as large as possible for a given amount of X-ray or gamma ray energy. This is particularly true in the medical tomography area where it is desired that the energy intensity of the X-ray be as small as possible to minimize any danger to the patient.

Another important property that the phosphor material should possess is a short primary decay, which can be measured as a decay time constant. As used herein, the term "decay time constant" means the time for luminescence output to decay to about 36.8 percent of the maximum light output after the excitation radiation ceases. This means that there should be a relatively short period of time between the termination of the high energy radiation excitation and the cessation of light output from the phosphor or scintillator. If this is not the case, there is a blurring, in time, of the information bearing signal generated, for example, when the scintillator is used to produce tomographic imaging data. Furthermore, if rapid tomographic scanning is desired, the presence of the primary decay tends to severely limit the scan rate, thereby rendering difficult the view of moving bodily organs, such as the heart or lungs.

Positron emission tomography scanners utilize gamma ray detector systems. The detector system is capable of capturing gamma rays and converting them into a luminescent output. The luminescent output is converted by means of a photo multiplier into an electrical signal. Bismuth germanate has the necessary high stopping power required for capturing gamma radiation, and has been used in gamma ray detection systems. The gamma ray stopping power of bismuth germanate has been measured to be about 0.955 per centimeter. The decay time constant for bismuth germanate is about 300 nanoseconds.

It is an object of this invention to provide a phosphor comprised of cerium in a lanthanide oxide fluoride compound wherein the lanthanides are lutetium, gadolinium, yttrium, and mixtures thereof having a tetragonal crystal form.

It is another object of this invention to provide a phosphor having a high X-ray or gamma ray stopping power, e.g., comparable to bismuth germanate.

It is another object of this invention to provide a phosphor having a high X-ray or gamma ray stopping power, and a fast decay time constant, e.g., less than the 300 nanosecond decay time constant for bismuth germanate.

BRIEF DESCRIPTION OF THE INVENTION

The phosphors of this invention are comprised of an effective amount of cerium to provide luminescence, in substantially a lanthanide oxide fluoride compound having a tetragonal crystal form. The lanthanide being from the group consisting of lutetium, gadolinium, yttrium, and mixtures thereof. The phosphors have a high stopping power for X-ray or gamma radiation, and the cerium provides luminescence with a high light output and a rapid decay of emitted light after luminescing. As used herein, the term "substantially a lanthanide oxide fluoride compound having a tetragonal crystal form," means the remainder of the composition is the lanthanide oxide fluoride compound having a tetragonal crystal form, however other compounds may be present up to an amount that does not substantially impair the light emitting properties of the phosphor. For example, compounds of lanthanide oxide, lanthanide fluoride, or rhombohedral crystal form lanthanide oxide fluoride may be present up to about 5 volume percent.

The tetragonal crystal form is a unit cell having perpendicular axis, and two of the axis are equal in length to each other but not to the third axis.

DETAILED DESCRIPTION OF THE INVENTION

The phosphors of this invention may be used in a wide variety of applications as cathodoluminescent or photoluminescent emitters. For example, the phosphors can be distributed in the scintillator structures disclosed in U.S. Pat. Nos. 4,362,946 and 4,230,510, incorporated herein by reference. Such scintillator structures provide optical coupling of luminescence from the phosphor distributed in the scintillator to photoelectrically responsive devices.

I have discovered that cerium will luminesce in select lanthanide oxide fluoride compounds having the tetragonal crystal form. An effective amount of cerium to provide such luminescence is at least about 0.01 mole percent, preferably about 0.01 to 10 mole percent, and most preferably about 0.1 to 1 mole percent of the compound. The cerium is incorporated or dissolved in the lanthanide oxide fluoride compound having the ideal formula $L_4O_3F_6$, where L is a lanthanide from the group lutetium, gadolinium, yttrium, and mixtures thereof. The tetragonal crystal form can be formed within the compositional range shown by the formula $LO_{1-x}F_{1=2x}$ where $0.1 \leq X \leq 0.3$, and L is lutetium, yttrium, or mixtures thereof. When the lanthanide is gadolinium, the tetragonal crystal form can be formed within the compositional range shown by the formula $GdO_xF_{3-2x}$ where $0.75 \leq X \leq 0.83$. Such lanthanide oxide fluoride compounds have a substantially tetragonal crystal form. It should be understood that cerium substitutes for the lanthanides in the tetragonal crystal sites.

The phosphors can be formed by conventional methods well known in the art for forming oxide phosphor powders, for example disclosed in U.S. Pat. No. 4,424,671, incorporated herein by reference. Briefly described, lanthanide fluorides, lanthanide oxides, cerium oxides, or cerium fluorides, or oxo-salts of the oxides, such as oxalates, carbonates, hydroxides, and nitrates that decompose to form the oxides, are mixed to a uniform distribution in a ratio that forms the lanthanide oxide fluoride compound having the tetragonal crystal form. The mixing can be carried out in an agate mortar and pestle or in a ball mill using water, heptane or an alcohol such as ethyl alcohol as a liquid vehicle. Suitable milling media that are non-contaminating to the phosphor, i.e. reduce the light emitting properties, are zirconia or Teflon synthetic resin polymers. Dry milling may also be used for both mixing and breakup of powder aggregates. If dry milling is employed a grinding aid such as 125 weight percent of stearic acid or oleic acid should be employed to prevent powder packing or sticking inside the ball mill.

If the mixture is formed with the oxo-salts such as the nitrates, carbonates, hydroxides, or oxalates, a calcining step is required to obtain the corresponding oxides. The oxo-salts can be calcined in a reducing atmosphere such as nitrogen, helium, or argon at about 700 to 1000° C. Preferably, the reducing atmospheres have an oxygen partial pressure of about $10^{-5}$ atmospheres or less. The oxide fluoride mixture is heat treated in an inert atmosphere such as nitrogen, helium, hydrogen, air, or a vacuum to form the lanthanide oxide fluoride compound. The compound can be formed by heating to about 1000° to 1300° C. for about 12 to 24 hours. The heat treatments to calcine and form the lanthanide oxide fluoride compound can be performed in a single heating step by heating to about 1000° to 1300° C. in the reducing atmosphere.

EXAMPLES

Phosphor powders in 25 gram quantities were formed by mixing lanthanide fluorides, lanthanide oxides, and about 1 mole percent cerium fluoride in a ratio to form the lanthanide oxide fluoride compounds. The mixtures were heated to 1200° C. in dry nitrogen for about 24 hours to form the lanthanide oxide fluoride compounds.

The powders were inspected by X-ray diffraction and found to have a substantially tetragonal crystal form. The light emission of the powders was measured by UV spectrophotometer, and the gamma ray stopping power was determined by calculation from the attenuation coefficient of the constituent elements. The decay time constant of light emitted from the phosphor powders after excitation by radiation was measured by the delayed coincidence method as disclosed for example in "Measurement of the Time Dependence of Scintillator Intensity by a Delayed Coincidence Method," L. M. Bollinger and C. E. Thomas, Review Scientific Instruments, vol. 32, 1961, pp. 1044–1050, incorporated herein by reference. The results of the light emission, and decay time constant tests are shown below in Table I. The gamma ray stopping power and decay time constant of a conventional bismuth germanate powder is shown for comparison.

TABLE I

| Composition | Peak of Light Emission (nanometers) | Full Width Half Max Range of Light Emission (nanometers) | Gamma Ray Stopping Power (cm$^{-1}$) | Decay Time Constant (nanoseconds) |
|---|---|---|---|---|
| $Lu_{3.96}Ce_{0.04}O_3F_6$ | 385 | 350–450 | 1.06 | 20–25 |
| $Gd_{3.96}Ce_{0.04}O_3F_6$ | 385 | 350–450 | 0.80 | |
| $Y_{3.96}Ce_{0.04}O_3F_6$ | 385 | 350–450 | 0.44 | |
| Bismuth Germanate | | | 0.955 | 300 |

A visual comparison of the light output of the lanthanide oxide fluoride powders was made with bismuth germanate, and the light output of the lanthanide oxide fluoride powders was observed to be comparable to or better than the bismuth germanate.

Referring to Table I, the lanthanide oxide fluoride compound phosphors of this invention having cerium luminescence provide about 46 to 111 percent of the gamma radiation stopping power of bismuth germanate, with a decay time constant of emitted light that is about an order of magnitude less. In summary, it has been observed that the lanthanide oxide fluoride powders provide comparable light output and gamma ray stopping power as compared to bismuth germanate, while providing a decay time constant of the emitted light that is about ten times faster than bismuth germanate.

What is claimed is:

1. A phosphor comprising:
   about 0.01 to 10 mol percent cerium, and the balance substantially a lanthanide oxide fluoride compound having the formula $LO_{1-x}F_{1=2x}$ wherein $0.1 \leq X \leq 0.3$, and where L is at least one lanthanide from the group lutetium and yttrium, the compound having substantially a tetragonal crystal form, said phosphor exhibiting cerium luminescence.

2. A phosphor according to claim 1 wherein the formula is $LO_{0.75}F_{1.5}$.

3. A phosphor according to claim 1 wherein the cerium is about 0.1 to 1 mole percent.

4. A phosphor comprising:
   about 0.01 to 10 mol percent cerium, and the balance substantially a lanthanide oxide fluoride compound having the formula $LO_xF_{3-2x}$ wherein $0.75 \leq X \leq 0.83$, and where L is gadolinium, the compound having substantially a tetragonal crystal form, said phosphor exhibiting cerium luminescence.

5. A phosphor according to claim 4 wherein the formula is $GdO_{0.75}F_{1.5}$.

6. A phosphor according to claim 4 wherein the cerium is about 0.1 to 1 mole percent.

* * * * *